US012560427B2

(12) United States Patent
Mallory et al.

(10) Patent No.: US 12,560,427 B2
(45) Date of Patent: *Feb. 24, 2026

(54) HVAC LINE SET ANALYZER SYSTEM

(71) Applicant: MalHack Tool Design, LLC, Queen Creek, AZ (US)

(72) Inventors: Brandon Mallory, Queen Creek, AZ (US); Douglass Macalister, Glendale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/029,756

(22) Filed: Jan. 17, 2025

(65) Prior Publication Data

US 2025/0327662 A1 Oct. 23, 2025

Related U.S. Application Data

(63) Continuation-in-part of application No. 18/638,839, filed on Apr. 18, 2024, now Pat. No. 12,352,483.

(51) Int. Cl.
| | |
|---|---|
| *G01F 22/02* | (2006.01) |
| *G01B 13/02* | (2006.01) |
| *G01B 13/16* | (2006.01) |

(52) U.S. Cl.
CPC ............. *G01B 13/02* (2013.01); *G01B 13/16* (2013.01); *G01F 22/02* (2013.01)

(58) Field of Classification Search
CPC ...... F25B 49/02; F25B 41/40; F25B 2500/01; F25B 2700/1933; F25B 2700/21
See application file for complete search history.

(56) References Cited

U.S. PATENT DOCUMENTS

| | | | |
|---|---|---|---|
| 3,060,735 A | 10/1962 | Baker | |
| 3,895,519 A | 7/1975 | Bouchy et al. | |
| 3,962,916 A | 6/1976 | Bouchy et al. | |
| 5,400,613 A * | 3/1995 | O'Neal | F25B 43/043 |
| | | | 62/195 |
| 5,460,030 A | 10/1995 | Bloxsom et al. | |
| 7,207,208 B2 | 4/2007 | Sutehall | |

(Continued)

FOREIGN PATENT DOCUMENTS

| | | |
|---|---|---|
| CN | 102279028 | 12/2011 |
| CN | 102486333 | 6/2012 |

(Continued)

*Primary Examiner* — Eric S. McCall
(74) *Attorney, Agent, or Firm* — Schmeiser, Olsen & Watts LLP

(57) ABSTRACT

An HVAC line set analyzer system is provided. The system includes a base unit and a remote unit, wherein the base unit is in communication with the remote unit. The base unit is configured to couple to an end of tubing of an HVAC line set and the remote unit is configured to couple to an opposing end of the tubing the HVAC line set. The base unit and the remote unit operate together in order to purge the tubing of all contaminates, remaining gases and so forth, equalize the temperature and then measure the length of the tubing of the HVAC line set, which length is an unknown length. This is done with two measurements. The first is the length of the tubing, and the second determines a number of sharp bends in that tubing and calculates an equivalent tubing length associated with the number of sharp bends.

12 Claims, 13 Drawing Sheets

(56)           References Cited

U.S. PATENT DOCUMENTS

|  |  |  |  |  |  |
|---|---|---|---|---|---|
| 7,958,744 | B1 * | 6/2011 | Beres | ...................... | F25B 45/00 |
|  |  |  |  |  | 62/298 |
| 10,337,902 | B2 | 7/2019 | Abate |  |  |
| 11,402,311 | B2 | 8/2022 | Gadea Ramos et al. |  |  |
| 2003/0083789 | A1 * | 5/2003 | Kalley | .................... | G09B 5/06 |
|  |  |  |  |  | 701/1 |
| 2016/0290694 | A1 * | 10/2016 | Pearl | ................. | B60H 1/00585 |
| 2017/0219223 | A1 * | 8/2017 | Tomaini | ................... | F24F 1/34 |
| 2022/0196246 | A1 * | 6/2022 | Gonzalez | ............. | F24C 15/327 |
| 2024/0035815 | A1 * | 2/2024 | Tanaka | ................... | F24F 11/52 |

FOREIGN PATENT DOCUMENTS

| CN | 110686386 | 1/2020 |
|---|---|---|
| CN | 111780328 | 10/2020 |
| CN | 115342475 | 11/2022 |
| DE | 3925067 | 2/1991 |
| DE | 4013373 | 9/1991 |
| FR | 2593911 | 8/1987 |
| JP | S59206718 | 11/1984 |
| JP | 61025005 | 2/1986 |
| JP | H06221892 | 8/1994 |
| JP | 2017227412 | 12/2017 |
| JP | 2020176798 | 10/2020 |
| RU | 2757167 | 10/2021 |

* cited by examiner

18

70

29

18

70

HVAC LINE SET ANALYZER SYSTEM

CROSS REFERENCE TO RELATED APPLICATION[S]

This application is a continuation-in-part of the earlier U.S. Utility patent application Ser. No. 18/638,839, filed Apr. 18, 2024, the disclosure of which is hereby incorporated entirely herein by reference.

BACKGROUND OF THE INVENTION

Technical Field

This invention relates generally to a system for analyzing a heating, ventilation, and air conditioning ("HVAC") line set, and more particularly to an HVAC line set analyzer system for measuring the length of the tubing and number of sharp bends in the tubing forming the HVAC line set.

State of the Art

HVAC systems are common in homes, businesses and the like. The amount of refrigerant utilized for an HVAC system is affected by the length of the line set, wherein the longer the line set, the more refrigerant that will be required to add to the HVAC system in order for it function optimally. It is also understood in the industry that the sharp bends are treated as longer in length than the mere length of the bend due to the turbulence caused in the flow of refrigerant through the bends and this alters to total line set length calculation. This becomes an issue when a technician is hired to replace an existing HVAC system because much of the line set is located within walls of the building in which the HVAC system is installed.

Conventionally, in order to charge the HVAC system with refrigerant, the technician guesses as to the length and amount of sharp bends in the line set make that on an educated guess and charges the HVAC system with refrigerant. After the system runs for a period of time, the technician typically needs to return and check to see if more refrigerant needs to be added, thereby taking more time, increasing cost and lost profits when the technician could be working on installation or repair of another HVAC system. Furthermore, technicians are not typically able to account for other factors affecting the HVAC system and the amount of refrigerant needed, such as temperature, barometric pressure, elevation and forth. There does not exist a tool or system that can accurately measure the length of an HVAC line set that can account for the number of sharp bends in the line set, as well as account for external factors that may affect measurement or amount of refrigerant to add.

Accordingly, there is a need for an HVAC line set analyzer system for measuring the length of the tubing and number of sharp bends in the tubing forming the HVAC line set.

SUMMARY OF THE INVENTION

An embodiment includes an HVAC line set analyzer system comprising: a base unit configured to couple to an end of a tube of an HVAC line set, the base unit comprising: a base unit housing with a lid, wherein the lid is closable to seal components within the base unit housing, thereby controlling the internal environment of the base unit; an on-board computing device coupled within the base unit housing; a pressure chamber coupled within the base unit housing; an external vacuum port coupled to the pressure chamber, the external vacuum port configured to couple to a vacuum; a filter coupled to the base unit housing; a fan coupled within the base unit housing and in fluid communication with the filter; a base unit tube coupled within the base unit housing with a portion extending out of the base unit housing; a junction coupled to the base unit tube; a pressure chamber valve coupled to the base unit tube; a temperature sensor coupled to the base unit tube within the base unit housing; a connector hose coupled to the portion of the base unit tube extending outside of the base unit housing; a pressure transducer coupled to the on-board computing device and to the tubing; a differential pressure transducer coupled to the on-board computing device and to port accessing ambient air outside of the base unit housing; a compressor coupled to the base unit tube, wherein the compressor is coupled on one side of the junction with a tubing line, the tubing line comprising a dehumidifier cartridge, with the pressure transducer coupled to a transducer junction along the tubing line between the compressor and the junction; an open/close valve coupled to an end of the base unit tube, the open/close valve configured to move between an open position opening the end of the base unit tube and a closed position closing the end of the base unit tube; a vent valve coupled to the open close valve, the vent valve configured to move between a sealed position sealing a vent hole formed in the base unit housing and an unsealed position unsealing the vent hole; an actuator coupled to the vent valve and the open/close valve; and a bleeder valve coupled to the base unit tube; and a remote unit configured to couple to an opposing end of the tube of the HVAC line set, the remote unit comprising: a remote unit housing with a lid, wherein the lid is closable to seal components within the remote unit housing, thereby controlling the internal environment of the remote unit; a computing device coupled within the remote unit housing; a wi-fi device coupled to the computing device; a remote unit tube coupled within the remote unit housing with a portion extending out of the remote unit housing; a temperature sensor coupled to the remote unit tube; a valve coupled to an end of the remote unit tube, the valve configured to move between an open position opening the end of the remote unit tube and a closed position closing the end of the remote unit tube; an actuator coupled to the valve and to the computing device; and a connector hose coupled to the portion of the remote unit tube extending outside of the remote unit housing.

Another embodiment includes a method of analyzing an HVAC line set, the method comprising: purging and equalizing temperature of the HVAC line set; drawing air out of a pressure chamber with a vacuum; measuring a length of the HVAC line set; and measuring a number of sharp bends of the HVAC line set.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

Figure 1:
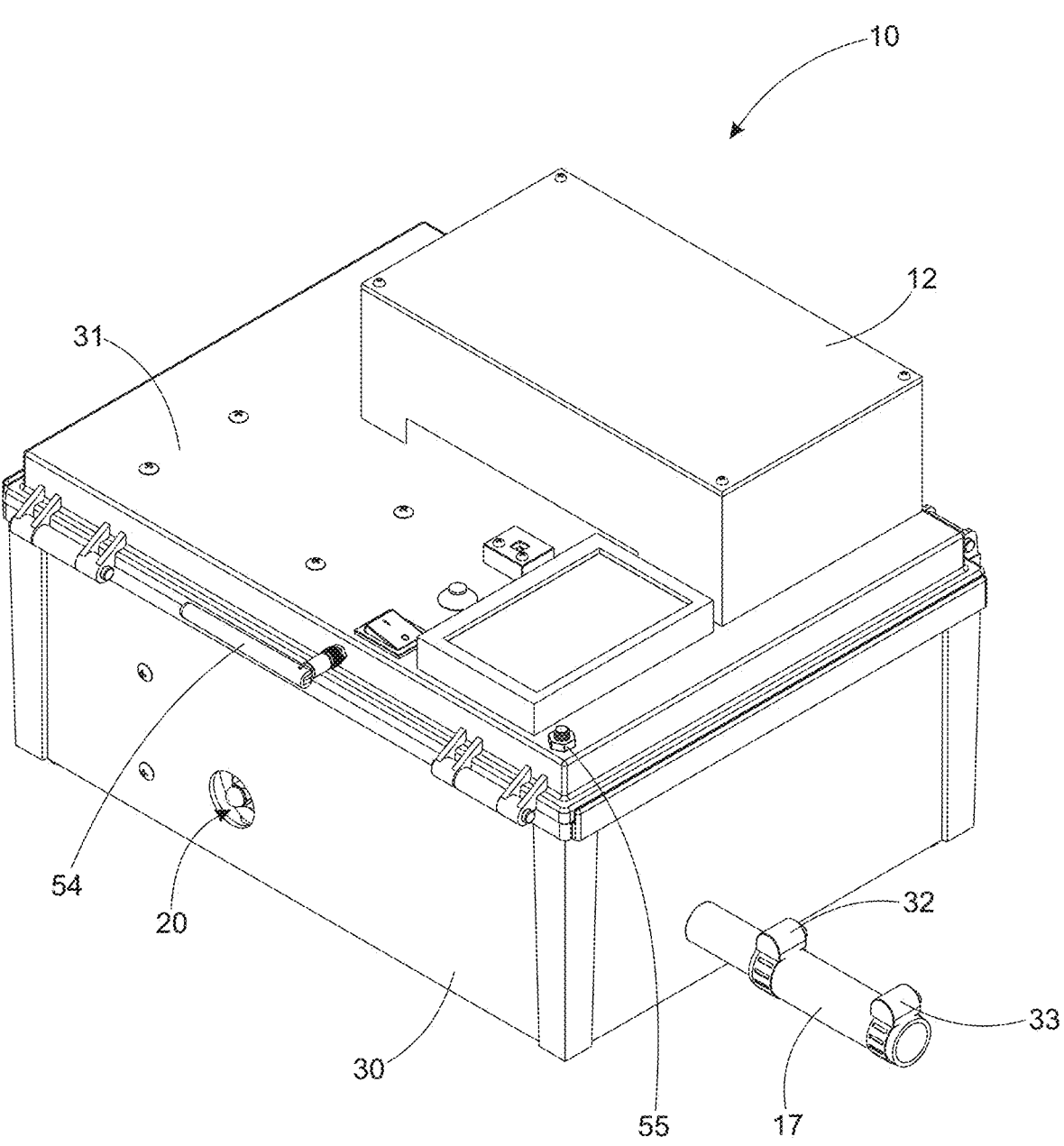
FIG. 1 is a perspective view of a base unit of an HVAC line set analyzer system, according to an embodiment.
Figure 2:
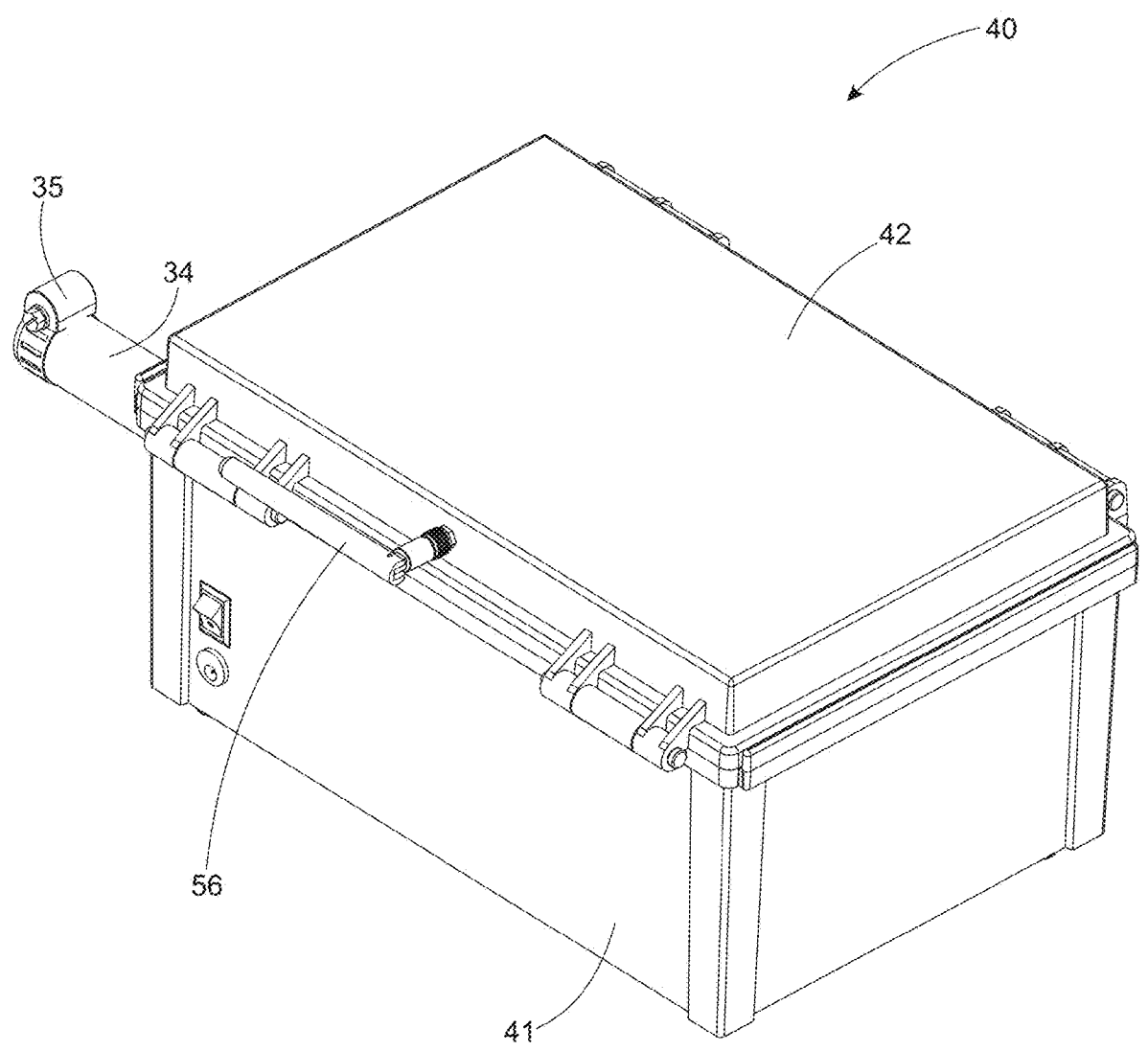
FIG. 2 is a perspective view of a remote unit of an HVAC line set analyzer system, according to an embodiment.

As discussed above, embodiments of the present invention relate to an HVAC line set analyzer system for measuring the length of the tubing and number of sharp bends in the tubing forming the HVAC line set.

Referring to FIGS. 1-6B, disclosed is an HVAC line set analyzer system 100 according to an embodiment. The system 100 comprises a base unit 10 and a remote unit 40. On a general level, the first operation of the system 100 includes purging the tubing of the line set 48 and equalizing the temperature in the base unit 10 and the remote unit 40 and the tubing 48. The second operation of the system 100 includes obtaining two measurements. The first measurement is the length of an unknown piece of tubing 48. The second measurement is to estimate how many sharp bends known as "brazed 90s" may be in that tubing 48. The components of the base unit 10 and the remote unit 40 work together in order to obtain the measurements.

Referring specifically to FIGS. 1 and 3A-3H, the base unit 10 comprises a housing 30 with a lid 31, wherein the lid 31 may be closed and sealed, thereby controlling the internal environment of the base unit 10. The components of the base unit 10 may be coupled within or on an outside of the housing 30, wherein the components of the base unit 10 are coupled within the housing unless expressly indicated that the component may be coupled on the outside of the housing 30. The base unit 10 further comprises a pressure chamber 11; a filter 12 (which may be coupled within or to an outer surface of the housing 30 or lid 31 as shown); a fan 13; a shroud 80 coupled between the fan 13 and the filter 12; a pressure chamber valve 15 (such as a pneumatic valve); a temperature sensor 16; a connector hose 17 coupled outside of the housing 30; a pressure transducer 21; a differential pressure transducer 22; an on-board computing device 23 with wi-fi capability utilizing base unit antenna 54; a power source 53; a compressor 24; an open/close valve 25; a vent valve 28 (which may be coupled within or to an outer surface of the housing 30) operatively coupled to the open/close valve 25 with a actuation connector 56, and an actuator 26 operatively coupled to the vent valve 28 and the open/close valve 25 through the actuation connector 56.

The open close valve 25 is coupled to a base unit tube 29, wherein tube 29 includes a junction 18. The junction 18 is used to couple the tube 29 to the compressor 24 on one side of the junction 18 and to the pressure chamber 11 on the other side with the pressure chamber valve 15 and a manifold 14 coupled along the line between the pressure chamber 11 and the junction 18. The pressure transducer 21 may be coupled to a junction 19 along the line between the compressor 24 and the junction 18. The differential pressure transducer 22 may be coupled to ambient pressure through a nozzle 55 in the lid 31 as shown or in the housing 30.

The base unit 10 may further include a bleeder valve 50 with a bleeder nozzle 51. The bleeder valve 50 may be coupled to the junction 19. The bleeder valve 50 operates to release pressure in the tube 29 and line set 48 when moving from a pressurized condition to an open condition. The bleeder valve 50 is opened prior to opening the open/close valve 25 and pressurized air flows out of bleeder nozzle 51. This allows the pressure in the tube 29 and line set 48 to reduce until a predetermined pressure level prior to opening to avoid damage and other negative effects to the base unit 10 caused by opening the open/close valve 25 with the tube 29 and line set 48 pressurized.

The base unit 10 may further comprise a barometric sensor 58. The barometric sensor 58 is coupled to the on-board computing device 23. The barometric sensor 58 may be a sensitive barometric pressure device. The barometric pressure variations that are present in real-life settings that this system 100 will operate may result in reducing accuracy should the system operate with a fixed air pressure standard, such as, 14.7 psi. In order to account for barometric variations, the barometric sensor 58 is incorporated to supply a starting pressure to the on-board computing device 23 that is real time accurate instead of a theoretical pressure. This results in greater accuracy of the calculations performed by the system 100.

Further still, the base unit 10 includes a control knob 90, a display 91 and a power switch 92. The control knob 90 and the display 91 are coupled to the power source 53 and the on-board computing device 23. The display 91 provides visual indicator of the process the system 100 is performing and the control knob 90 allows for inputting the process to perform by the system 100. The power switch 92 operates to turn on power for all components of the base unit 10.

Figure 3A:
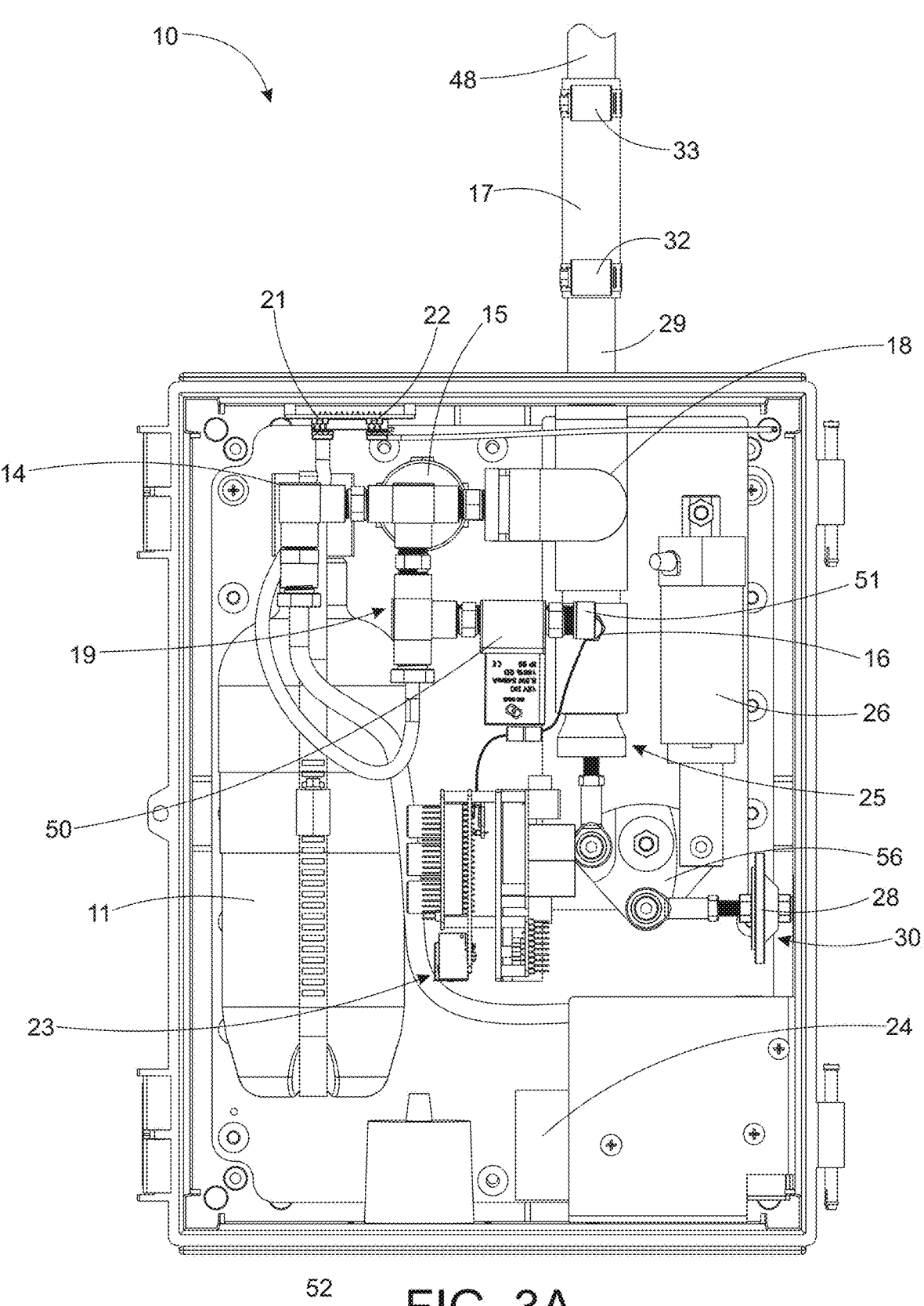
FIG. 3A is a top view of a base unit of an HVAC line set analyzer system without a lid, according to an embodiment.
Figure 3B:
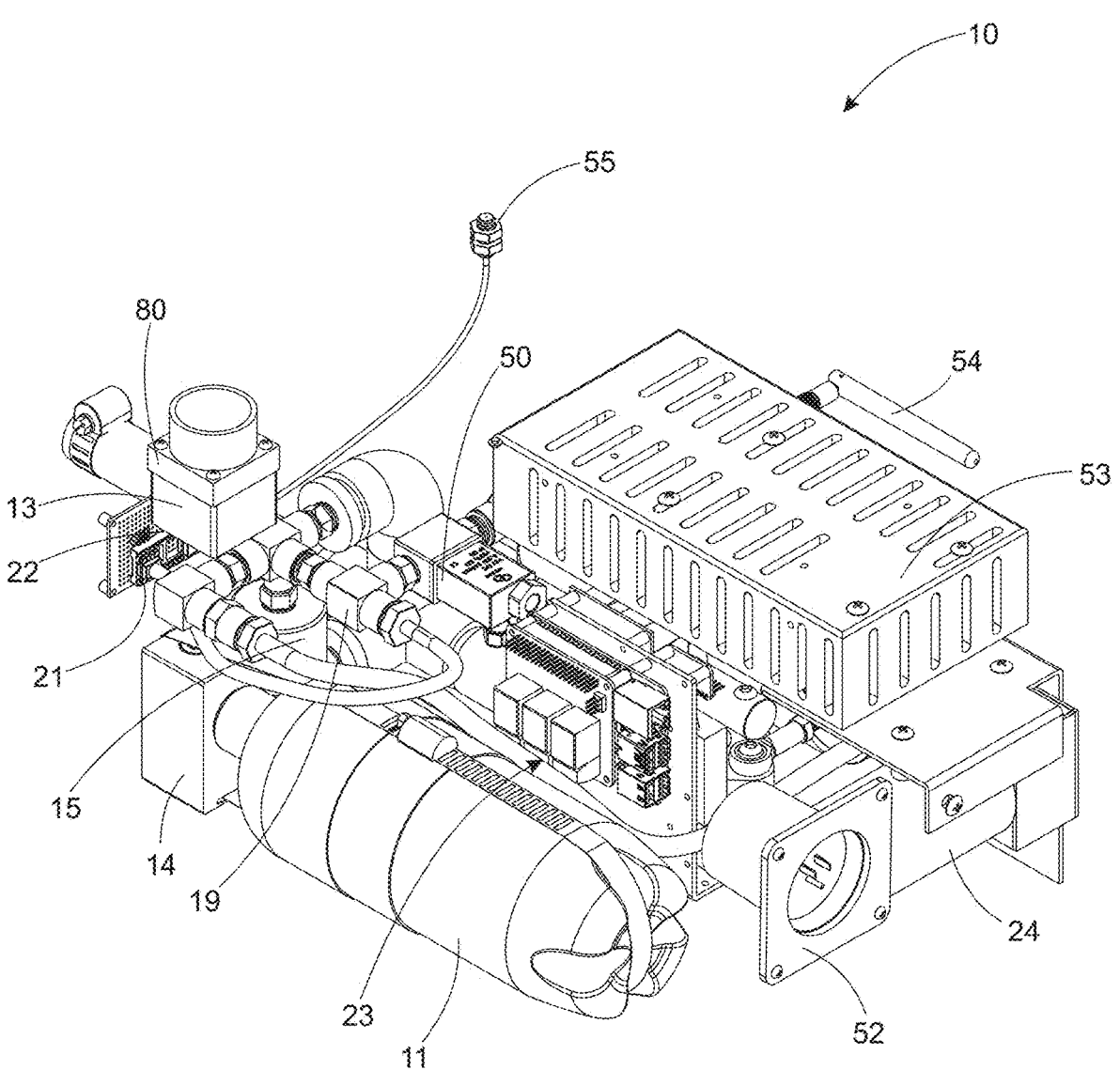
FIG. 3B is a perspective view of a base unit of an HVAC line set analyzer system without a housing or lid, according to an embodiment.
Figure 3C:
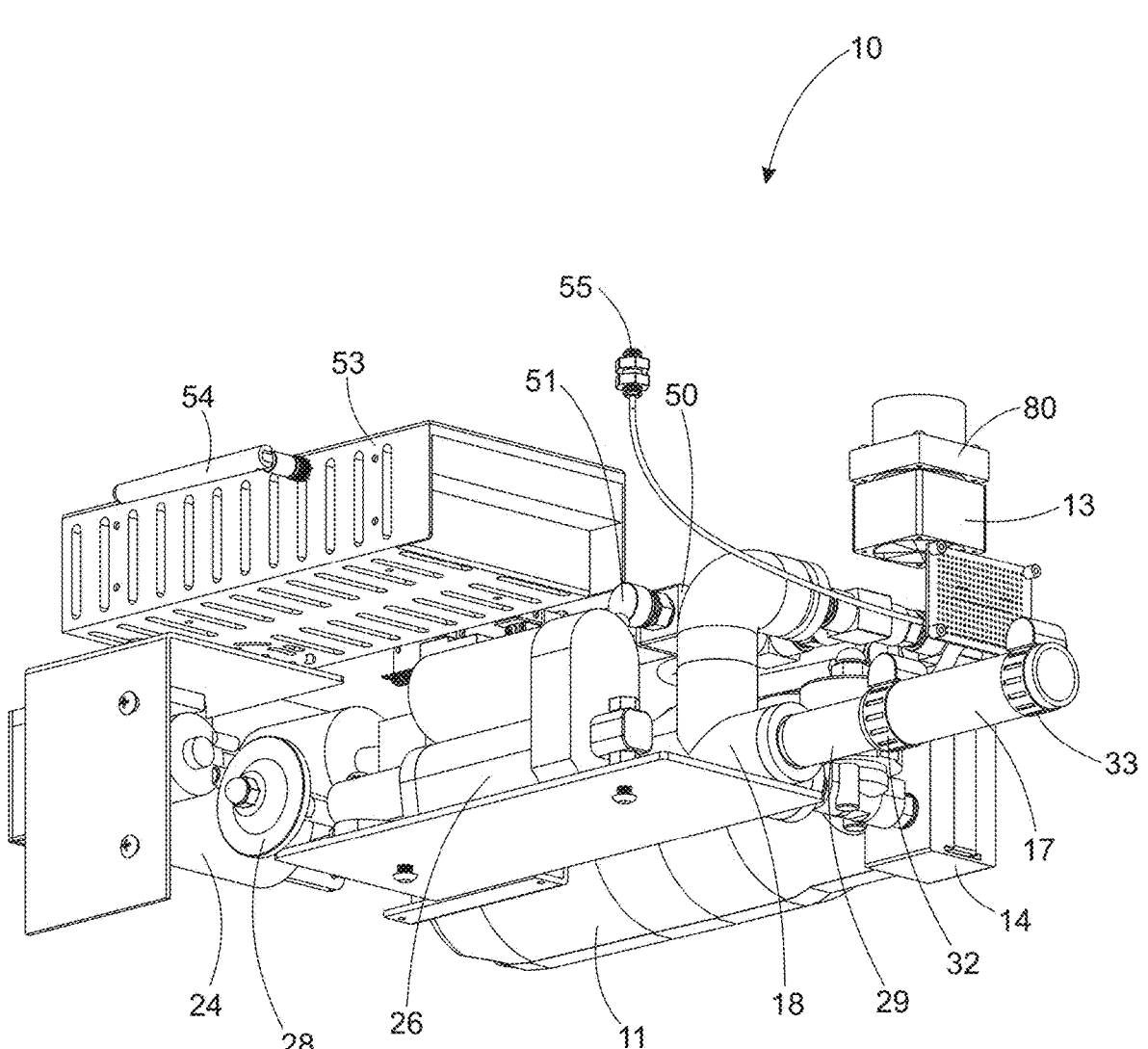
FIG. 3C is a perspective view of a base unit of an HVAC line set analyzer system without a housing or lid, according to an embodiment.
Figure 3D:
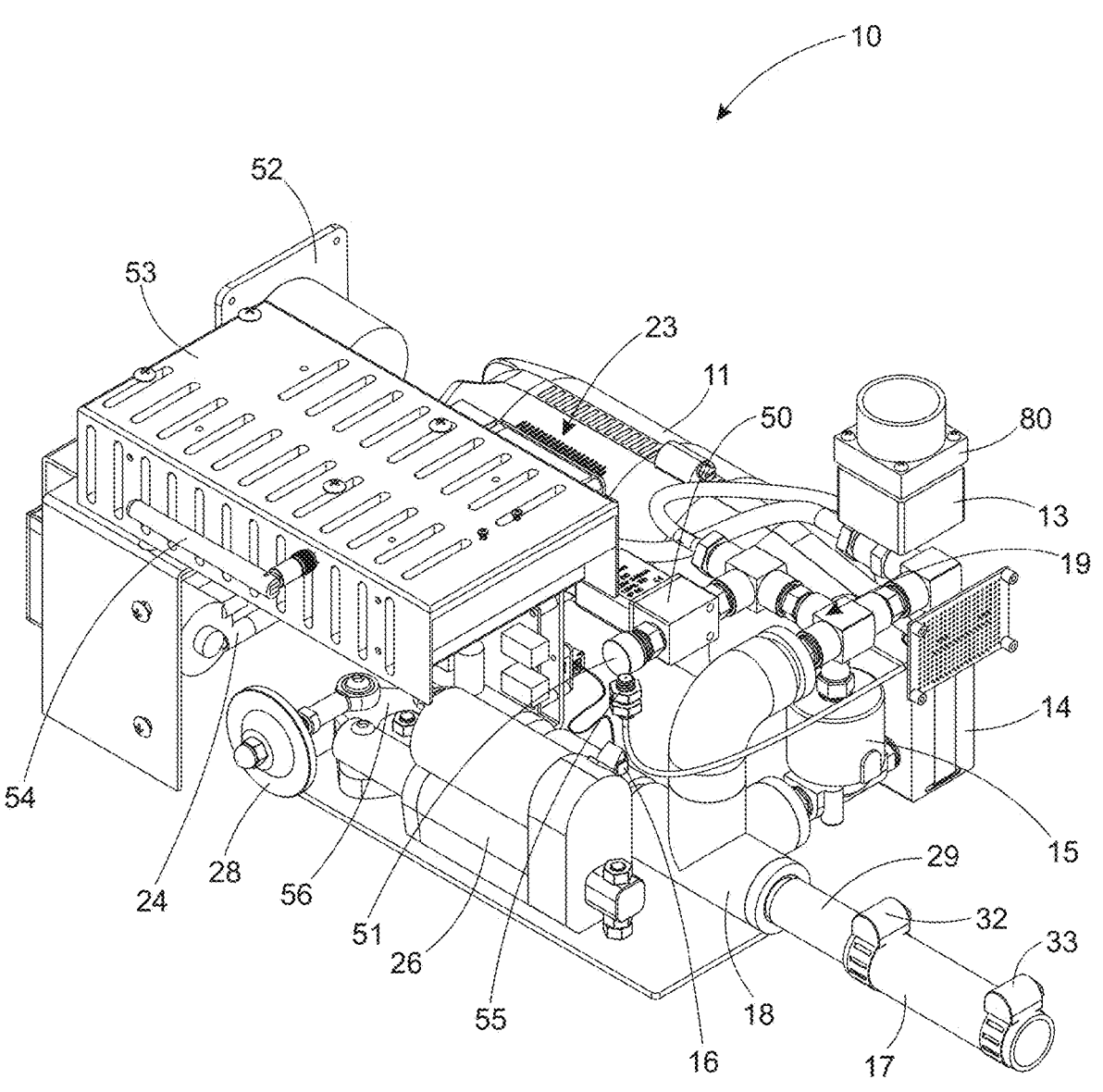
FIG. 3D is a perspective view of a base unit of an HVAC line set analyzer system without a housing or lid, according to an embodiment.
Figure 3E:
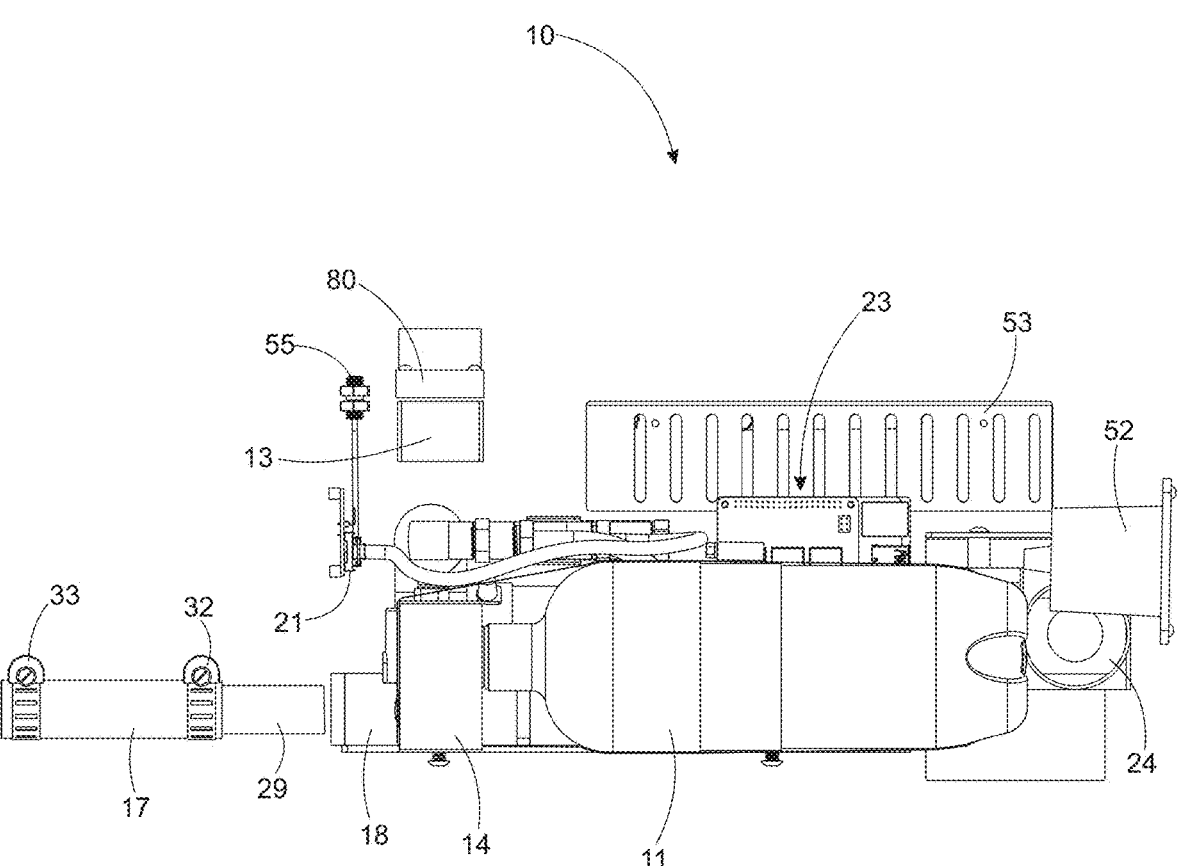
FIG. 3E is a left side view of a base unit of an HVAC line set analyzer system without a housing or lid, according to an embodiment.
Figure 3F:
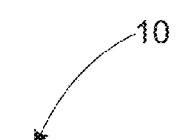
FIG. 3F is a front view of a base unit of an HVAC line set analyzer system without a housing or lid, according to an embodiment.
Figure 3F:
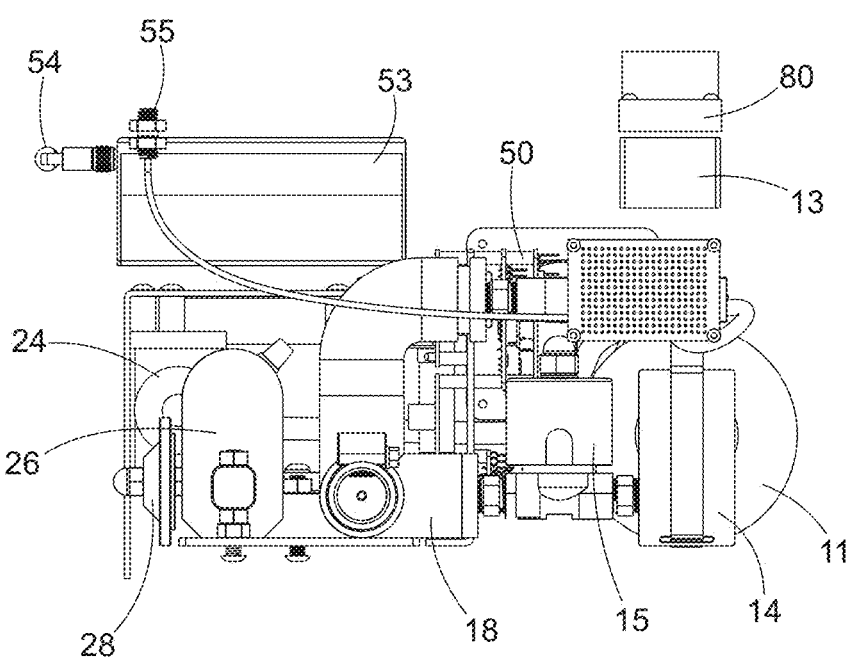
Figure 3G:
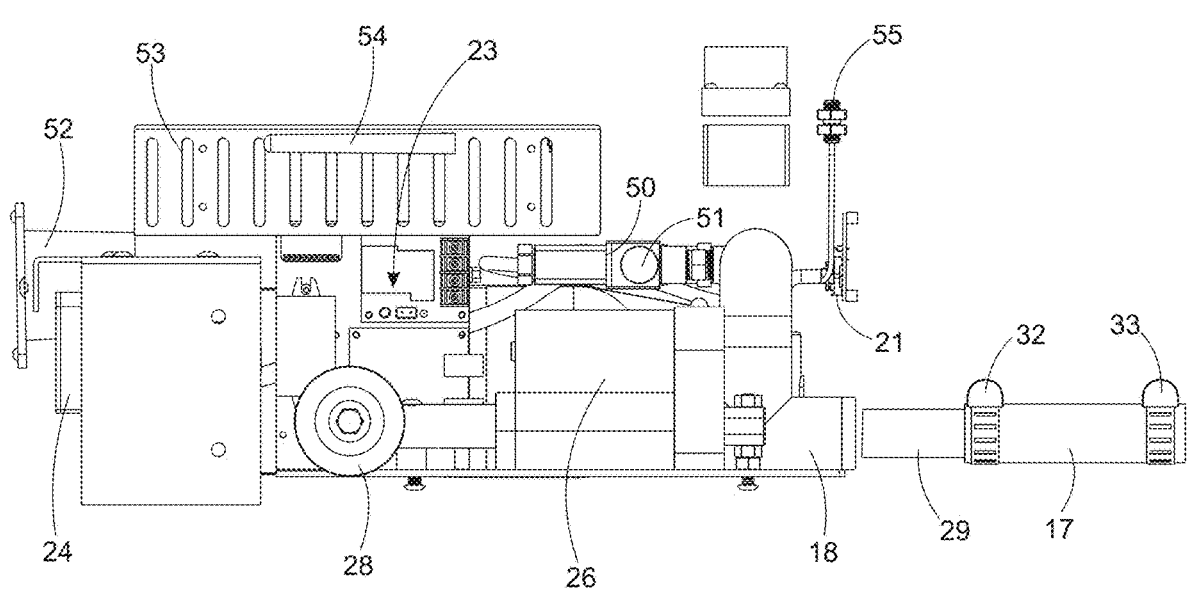
FIG. 3G is a right side view of a base unit of an HVAC line set analyzer system without a housing or lid, according to an embodiment.
Figure 3H:
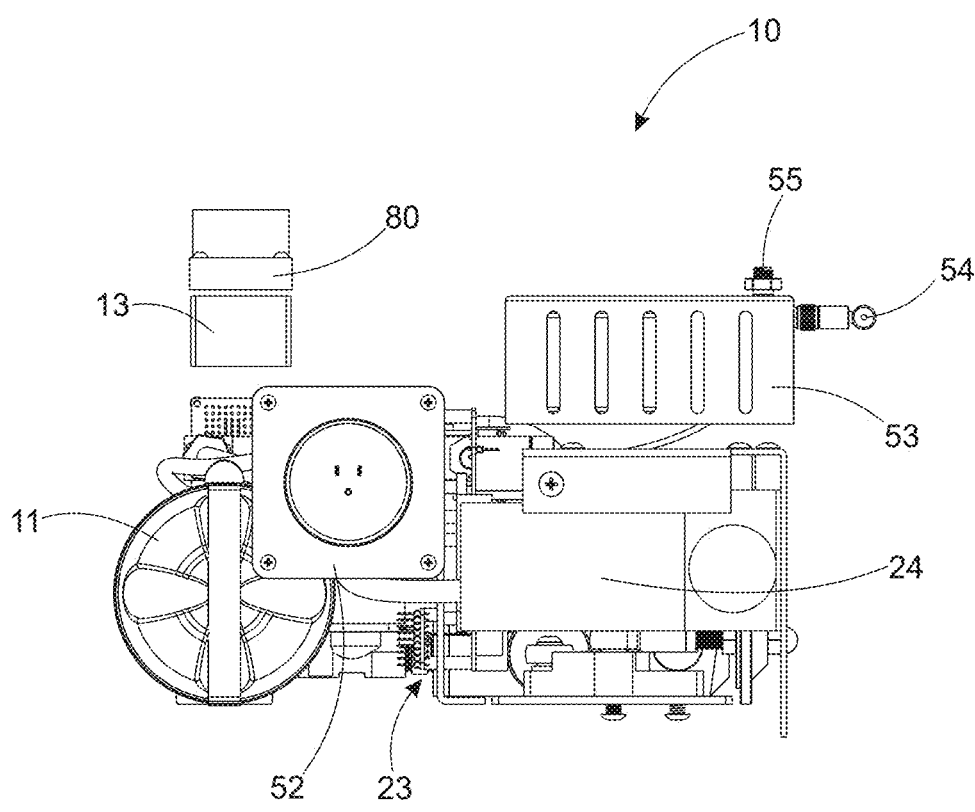
FIG. 3H is a rear view of a base unit of an HVAC line set analyzer system without a housing or lid, according to an embodiment.
Figure 4:
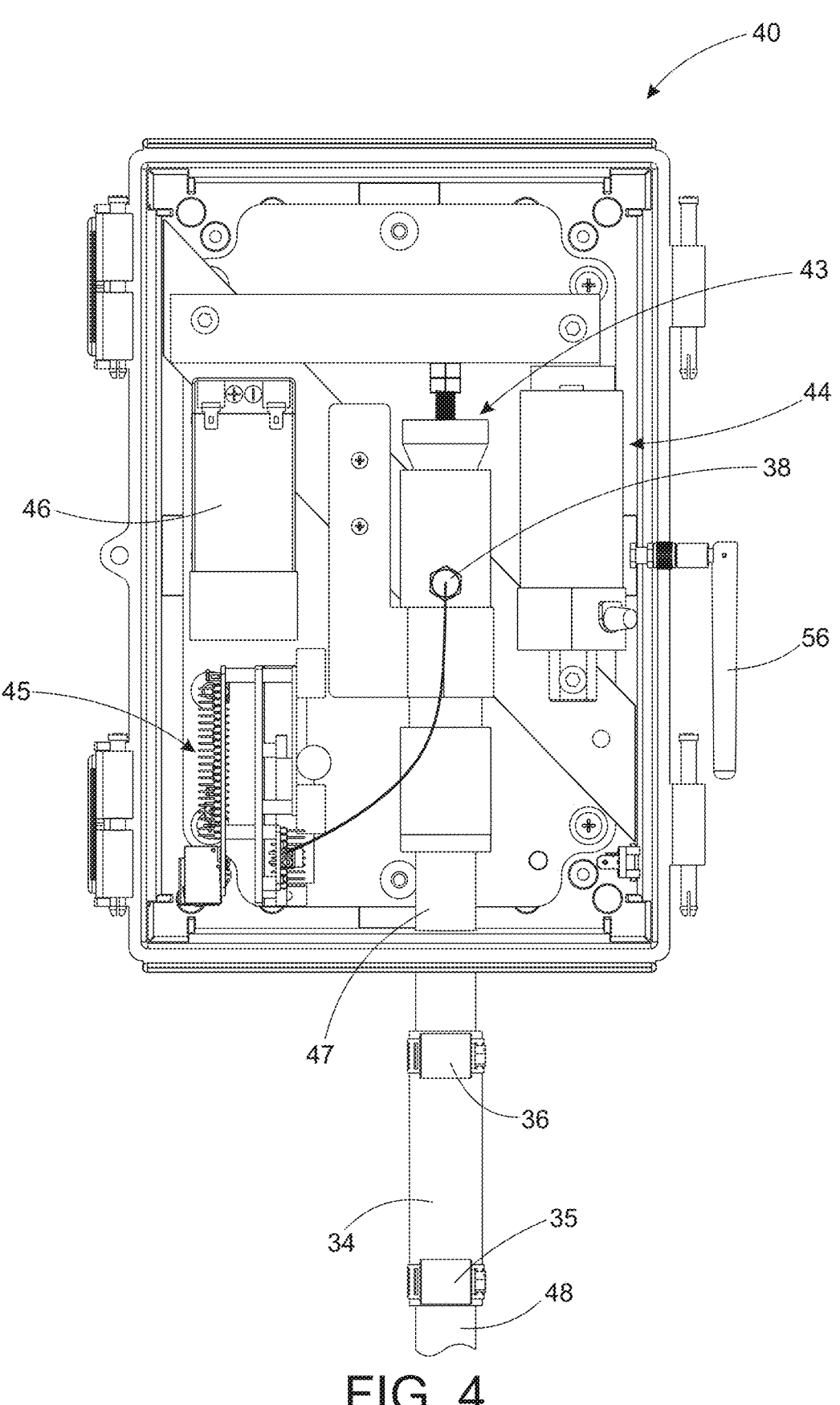
FIG. 4 is a top view of a remote unit of an HVAC line set analyzer system without a lid, according to an embodiment.

The base unit 10, as shown in FIG. 3A, may also include an external vacuum port 60 with a valve, such as a ball valve, and a dehumidifier cartridge 62, such as, but not limited to, a desiccant cartridge that may be disposable or non-disposable. The external vacuum port 60 may be coupled to between the pressure chamber 11 and a vacuum (not shown), wherein the valve of the external vacuum port 60 may be opened to allow for the evacuation of the pressure chamber 11 in response to operation of the vacuum to draw air out of the pressure chamber 11. The dehumidifier cartridge 62 operates to remove humidity from the air used to pressurize the line set 48. The dehumidifier cartridge 62 may be coupled to the line from the compressor 24 that pressurizes the line set 48.

Figure 6A:
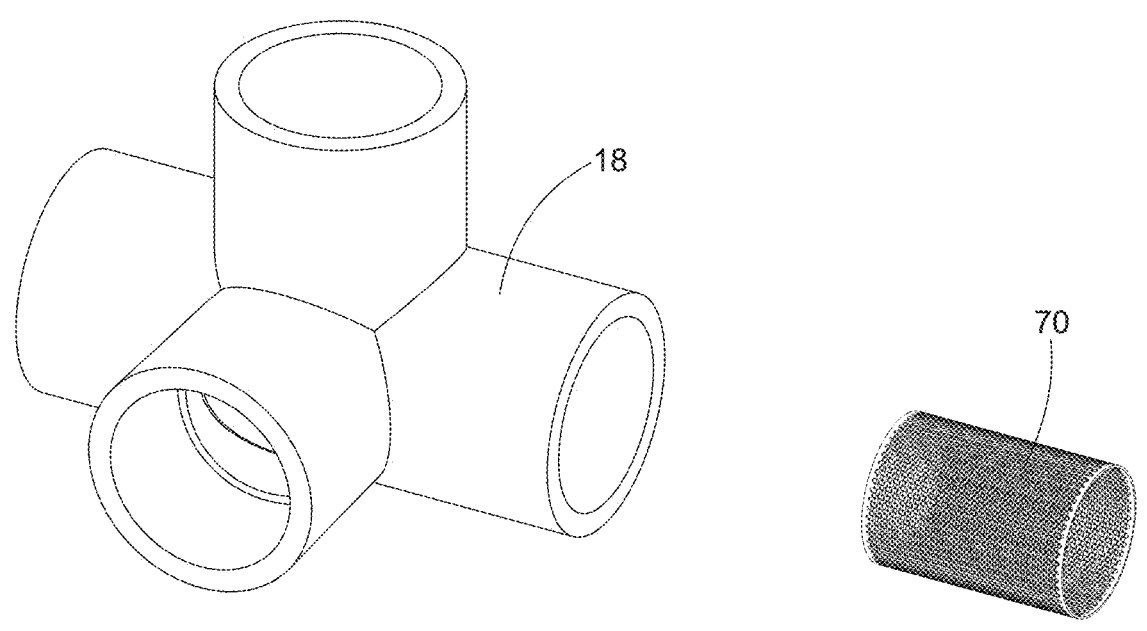
FIG. 6A is an exploded view of a junction with a filter for use with an HVAC line set analyzer system without a lid, according to an embodiment.
Figure 6B:
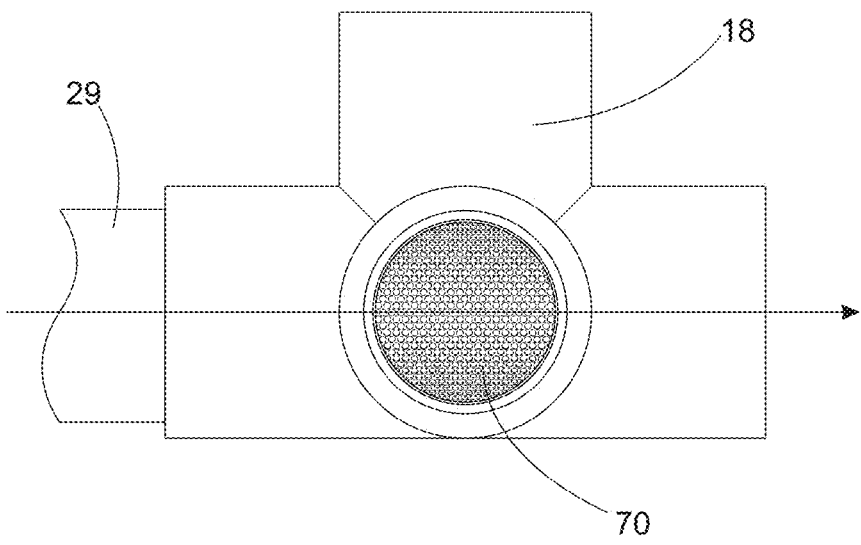
FIG. 6B is a side view of a junction with a filter for use with an HVAC line set analyzer system without a lid, according to an embodiment.

Referring additionally to FIGS. 6A-6B, the junction 18 may include a filter 70 that may be tubular in shape with openings on each end to allow for air flow through the openings of the filter 70 wherein the filter 70 is oriented within the junction 18 so that air flow through tube 29 goes through the openings of the mesh filter 70. The filter 70 may be formed of a wire mesh, such as a #100 wire mesh. When air is flowing straight through the junction 18 at a high velocity, the legs of the junction 18 that extend 90-degrees can cause oscillations that disturb the flow. The legs are still open to the junction 18, but the filter operates to dampen the oscillations.

The remote unit 40 comprises a housing 41 with a lid 42, wherein the lid 42 may be closed and sealed, thereby controlling the internal environment of the remote unit 40. The components of the remote unit 40 may be coupled within or on an outside of the housing 41, wherein the components of the remote unit 40 are coupled within the housing 41 unless expressly indicated that the component may be coupled on the outside of the housing 41. The remote unit 40 comprises a temperature sensor 38; a valve 43; an actuator 44; a computing device 45 that is wi-fi enabled and coupled to remote unit antenna 57, the computing device 45 coupled to the actuator 43; a power unit 46; and a connector hose 34 coupled outside of the housing 41.

The base unit 10 and the remote unit 40 of the system 10 operate to obtain the measurements of the length of the tubing 48 of an HVAC line set and the number of sharp bends in the line set. Accordingly, operation of the system 10 may include the following description of connecting the system to an HVAC line set; purging and equalizing temperature; measuring length of tubing; and measuring a number of sharp bends.

Connecting the HVAC Line Set Analyzer System

The base unit 10 is connected to an end of the tubing 48 to be measured by coupling connector hose 17 to a base unit tube 29 with a clamp 32 on one end and to the end of tubing 48 with a clamp 33 on the other end. The base unit 10 is coupled to the end of the tubing 48 located within the home or building, such as in a space wherein the air handler is located, like, without limitation, an attic of a home.

The remote unit 40 is connected in similar manner by connector hose 34 coupled to remote unit tube 47 with a clamp 36 on one end and to the end of tubing 48 with a clamp 35. The remote unit 40 is coupled to the far end of the tubing 48 to be measured, located at the end of the tubing outside of the home or building. The remote unit 40 is controlled through the computing device 45.

Once connected, the electrical power to the base unit 10 and the remote unit 40 may be turned on which will activate the fan 13 and the on-board computing device 23. The fan 13 draws air into the housing 30 through filter 12, and the fan 13 typically remains on throughout the operation of the base unit 10. The fan 13 serves multiple purposes as will be explained later. The fan 13 may be a high flow, high static pressure fan, with speed control.

Purging and Equalizing Temperature

An operator may operate the system 10 to purge and equalize temperature, wherein operation of a purge and equalizing temperature sequence includes the following. A command will be sent from the base unit 10 to the remote unit 40 to open the valve 43. This is done by computing device 45 receiving the signal sent from the on-board computing device 23 in a signal with a command to open the valve 43. The computing device 45 sends a signal to the actuator 44 that operates to move the valve 43 to an open position and maintain the valve 43 in the open position. This valve 43 was designed to open so that it produces no turbulence or static back pressure to air flowing out of it.

Next the base unit 10 shall momentarily open pressure chamber valve 15 to equalize the pressure chamber 11 with ambient air pressure. The actuator 26 of the base unit 10 will operate to close vent valve 28 and open the open/close valve 25. The vent valve 28 operates to seal a vent hole 20 formed in the housing 30 of the base unit. The open/close valve 25 in an open position opens an end of the tubing 29. This places the base unit 10 and the remote unit 40 in a condition where the only way air flow from the fan can escape is through the tubing 48 to be measured. This purging operation will continue until the temperature sensor 16 in the base unit 10 and the temperature sensor 38 in the remote unit 40 give nearly equal readings. This operation purges the tubing 48 of any contaminants such as refrigerant, moisture, or nitrogen, while also equalizing the temperature. The on-board computing device 23 will then recognize when the temperatures are within a predetermined temperature range from each other and alert the operator to end the purging and equalizing step and proceed to the next step of measuring a length of the tubing 48.

It is important to note that the temperature sensors 16 and 38 have a secondary function that includes helping refine the length measurement of the line set that is described below, since pressure varies with temperature. The system operates to purge and equalize temperature in the HVAC line set to avoid changes happening during the measurement step that follows. Additionally, the system 100 may use the final temperature to calibrate the measurement.

Measuring Length of Tubing

An operator may operate the system 10 to measure the length of the tubing 48, wherein operation of a measure the length of the tubing sequence includes the following.

The base unit 10 operates the on-board computing device 23 and the barometric sensor 58 to obtain a real time actual starting pressure accounting for any barometric variations. A command will then be sent from the base unit 10 to the remote unit 40 to close the valve 43. This is done by computing device 45 receiving the signal from the on-board computing device 23 with the command to close the valve 43. The computing device 45 sends a signal to the actuator 44 that operates to move the valve 43 to a closed position and maintain the valve 43 in the closed position. In response to a command from the on-board computing device 23, the actuator 26 of the base unit 10 will operate to open vent valve 28 and close the open/close valve 25. The pressure chamber valve 15 is moved to a closed position, thereby cutting off the pressure compartment 11 from the rest of the system 10. The technician may connect a vacuum (not shown) to the external vacuum port 60 and opening the valve of the external vacuum port 60. Operating the vacuum results in drawing air from the pressure chamber 11, thereby leaving an exact known volume with nothing in it. Following evacuating the pressure chamber 11 by use of a vacuum, the compressor 24 will pressurize the system 10 and the tubing 48 to a preset pressure as measured by pressure transducer 21. The pressurization of the tubing 48 includes directing the air from the compressor 24 through the dehumidifier cartridge 62 to remove humidity from the tubing 48 that can cause problems when calculating the length of the tubing 48. The base unit 10 will then operate to open the pressure chamber valve 15. This will add the exact known empty volume of the pressure chamber 11 to the volume being measured. By opening the pressure chamber valve 15 to open the pressure chamber 11 to volume being measured, a measurable pressure drop is caused. The on-board computing device 23 will use this pressure difference to calculate the volume of the unknown length tubing 48, since the pressure chamber 11 shall be a precisely known volume. The volume measurement will then be converted into length by the on-board computer 23. The tubing 48 is conventionally a ⅞ inch HVAC tubing known to be precisely 0.785 inches inside diameter, thereby utilizing a math conversion to calculate the length of the tubing 48 from the pressure. It will be understood that the fan 13 is constantly running during operation of the base unit 10 and performs a dual function of flowing air into the line set 48 when it is open and cooling the electrical components within the housing 30 of the base unit 10.

Measuring a Number of Sharp Bends

An operator may operate the system 10 to measure the number of sharp bends or 90-degree bends of the tubing 48, wherein operation of a measure the number of sharp bends sequence includes the following.

The on-board computing device 23 will then send a command to the bleeder valve 50 to open and bleed off pressure from the tube 19 and the line set 48, wherein pressurized air flows through the bleeder valve 50 and out of the bleeder nozzle 51 until the pressure transducer 21 measures the pressure within the tube 19 and line set 48 at a predetermined pressure level. Once the predetermined pressure level is met, a command will be sent from the base unit 10 to the remote unit 40 to open the valve 43. This is done by computing device 45 receiving the signal from the on-board computing device 23 with the command to open the valve 43. The computing device 45 then sends a signal to the actuator 44 that operates to move the valve 43 to an open position and maintain the valve 43 in the open position. In response to a command from the on-board computing device 23, the actuator 26 of the base unit 10 will operate to close vent valve 28 and open the open/close valve 25. The fan 13 is set and operates at a calibrated speed. The static pressure in the housing of the base unit 10 shall be measured by the differential pressure transducer 22. The on-board computing device 23 may have stored in and accessible form memory of the on-board computing device 23 a look up table of the expected static pressure for a given length of tubing. Long radius bends make very little change in this pressure, but sharp zero radius bends known as (brazed 90s) generate turbulence, thereby providing a significant step up in static pressure. The on-board computing device 23 can then estimate with a high degree accuracy how many sharp bends are in the unknown length of tubing based on the step up in the static pressure. The on-board computing device 23 may then perform a simple calculation of an equivalent length tubing associated with the number of sharp bends of tubing and add that length to the measurement of the length of the tubing 48 for a total length tubing for purposes of adding refrigerant to the HVAC system.

The fan 13 operates constantly during of operation of the HVAC line set analyzer system 100. In some embodiments, referring to FIGS. 5A-5B, a shroud 80 may be coupled between the fan 13 and the filter 12. The shroud 80 includes a conical section 82 that expands from an intake opening 81 open to air being drawn in through the filter 12 and drawn through a transition opening 83, the intake opening 81 larger than the transition opening 83. The transition opening 83 transitions to a stepped cone section 84 with an exit opening

85 that is placed adjacent to the fan 13 intake. The exit opening 85 is larger than the transition opening 83.

With no shroud, issues arise with the high flow, high static pressure fan 13. It is only high static pressure up to where the restriction causes the blades to stall and then the pressure collapses in the system 10. At high restriction the air stops passing through the fan and spins in a ball above the fan 13. The centrifugal force of the spinning air actually pulls air away from the fan, creating a slight vacuum where there needs to be positive pressure for the system 10 to operate correctly.

Figure 5A:
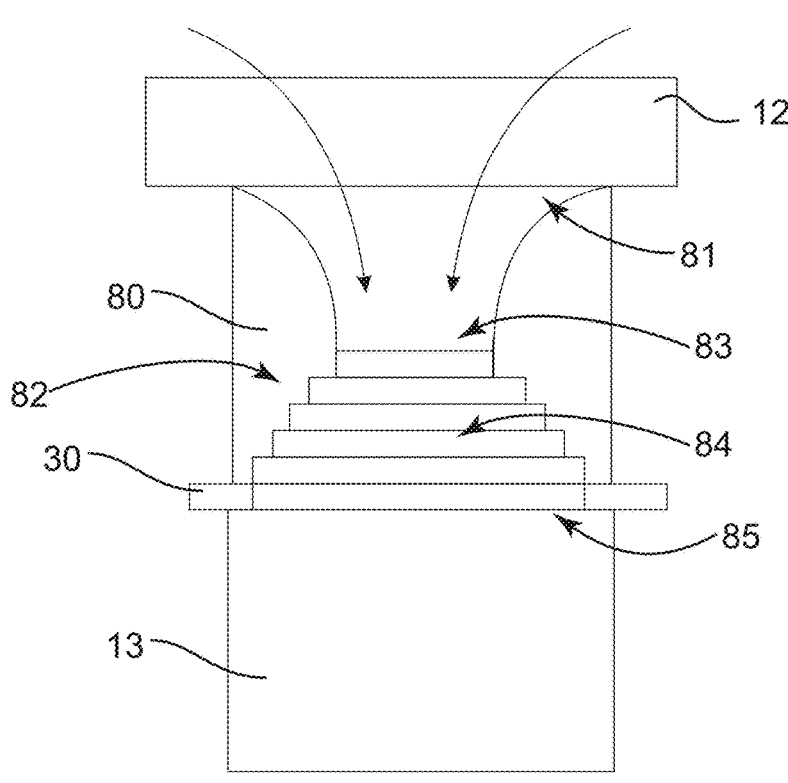
FIG. 5A is a section view of a fan with a shroud for use with an HVAC line set analyzer system without a lid, according to an embodiment.
Figure 5B:
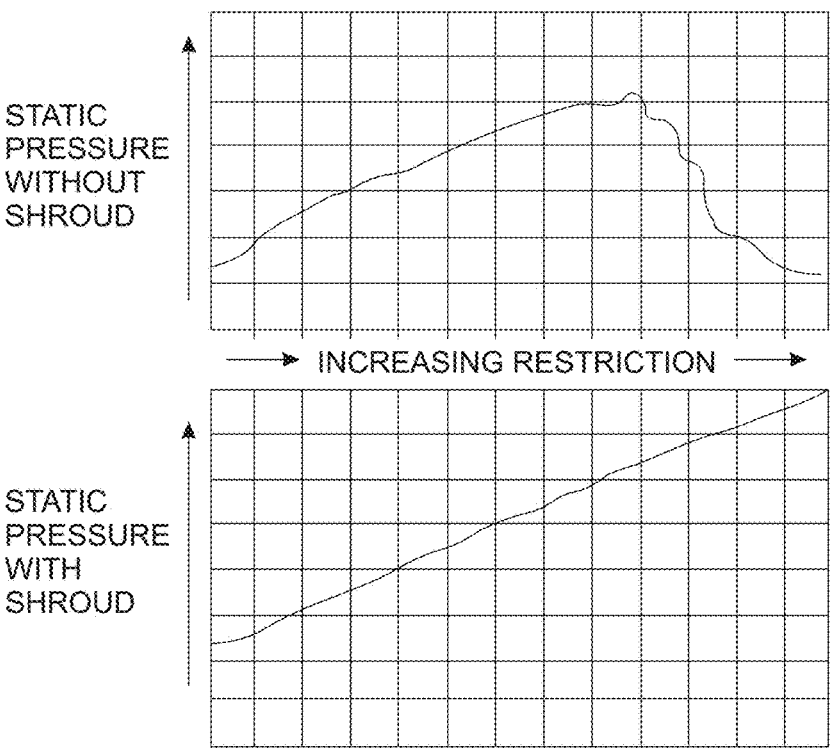
FIG. 5B are graphs illustrating the static pressure with increasing restriction when a shroud is present or not present.

With the shroud, the conical section 82 works with the stepped cone section centrifugal force causes rings of spinning air to progress toward the fan creating positive pressure. The stepped cone section 84 operates to maintain a positive pressure and thereby eliminating blade stall and the maximum static pressure is increased by up to 30%. The shroud 80 has been tested, and as shown in FIG. 5B, the uncertainty of the static pressure with increasing restriction when there is no shroud is eliminated when the shroud 80 is present. The shroud 80 provides for predictable static pressure and can be accounted for by an on-board computing device 23 that processes data with respect to the fan. It further improves the operation of the fan 13 or any fan that the shroud 80 is coupled to.

As a summary of the operation of the system 10, it should be appreciated that the purpose of the HVAC line set analyzer system 10 is to give an HVAC technician the correct amount of refrigerant charge to use when installing a split AC system where the compressor and the air handler are in separate locations. The refrigerant charge varies with the length of the line set that is the copper tubing connecting the two components. The required amount of refrigerant is based on two things—1) the volume or length of the tubing, and 2) the number of sharp "hard 90" bends in the tubing. Each of those sharp bends adds the equivalent of approximately 4.1 feet of length, because in actual operation the refrigerant accumulates at these sharp bends. This means that the functional amount of refrigerant available to the compressor is less than it should be. So, the correct amount of refrigerant is the amount specified by the AC unit manufacturer per foot of tubing, plus the amount needed to compensate for any sharp 90 degree bends.

The volume calculation uses Boyle's Law. The system 10 comprises a precise known volume container (pressure chamber 11), which the vacuum (not shown) draws out air leaving an exact known space with nothing in it. The system 10 pressurizes the copper tubing forming the line set 48 to a precise pressure, wherein the system opens a valve to add the exact known volume of the pressure chamber 11, resulting in a measurable pressure drop. The system 10 now has three of the four variables (two pressures and one volume) for Boyle's Law, and can solve for the fourth, which is the volume of the line set 48. It must also be noted that Boyle's Law is affected by humidity, temperature, and mixed gasses with different compressibility. The humidity correction is handled by the dehumidifier cartridge 62 in the line from the compressor 24. The temperature correction is done as follows. Air is blown through the system 10 and the tubing 48 until two temperature sensors at either end are nearly the same. This also removes any gases that are not air (nitrogen or refrigerant). Since the environment in which the tool is used can vary widely in temperature and humidity, these preparatory steps are necessary for accurate measurement and are simply part of using Boyles Law correctly in a real-world situation.

The second error in the measurement, the hard 90 bends, is solved with the principle of Reynolds numbers, that is, laminar versus turbulent flow in a pipe. The same fan that is used to clear the tubing and equalize temperature, is used to generate airflow through the tubing which creates a measurable static pressure. At the correct velocity, the static pressure, based on laminar flow through straight tubing or gently bent tubing, will be predictable for different lengths of tubing. However, the same velocity of airflow through a sharp (hard 90) bend will create a spike in static pressure due to turbulence in the bend. The system 10 can count the number of bends based on incremental increases in static pressure. In case the restriction is not caused by a hard 90 bend installed, but some other pinching or damage to the line set 48, the measurement is still valid, and the job would still require the extra refrigerant.

The system 10 now has enough information to determine the refrigerant charge with a high degree of accuracy. The system 10 does not give the technician all the intermediate information, but rather it calculates, and gives the technician only the required refrigerant charge for the installation. The technician has two essential tasks to operate the system 10. First, run the measurement sequence. Second, enter the brand of AC unit being installed. Each manufacturer may include a partial charge of refrigerant with the unit. Therefore, after the technician enters the brand name, the system calculates, and displays the remaining charge needed to complete the installation.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A method of analyzing an HVAC line set, the method comprising:
   coupling a base unit of an HVAC line set analyzer system to an end of tubing of an HVAC line set, the base unit comprising a computing unit; and
   measuring, with the computing unit of the base unit, a volume of the HVAC line set in response to pressurizing the HVAC line set by the base unit and measuring, with a pressure sensor, a pressure drop created in the HVAC line set by the base unit.

2. The method of claim 1, wherein measuring a volume of an HVAC line set further comprises:
   pressurizing the tubing of the HVAC line set with dry air to a preset pressure as measured by a pressure sensor of the base unit;
   opening a valve of the base unit to add a known volume to a volume of the tubing of the HVAC line set being measured;
   measuring a pressure drop caused by adding the known volume to the volume of the tubing of the HVAC line set being measured; and
   operating the computing unit to calculate a volume of an unknown length of the tubing of the HVAC line set in response to calculating the pressure drop and the known volume.

3. The method of claim 1, further comprising determining a number of 90-degree bends of the HVAC line set in response to flowing air through the HVAC line set to establish a static pressure and calculating a difference between a measured static pressure and an expected static pressure.

4. The method of claim 3, wherein measuring a number of 90-degree bends of the HVAC line set further comprises:
   flowing air through the HVAC line set in response to operating a fan of the base unit at a calibrated speed;
   measuring a static pressure in the base unit with a differential pressure sensor;
   operating the computing device to compare the measured static pressure with a look up table of an expected static pressure for a given length of tubing without any 90-degree bends that is stored in a memory of the computing device of the base unit and calculate a difference of pressure; and
   analyzing the difference of pressure by the on-board computing device to determine a number of 90-degree bends in the tubing of the HVAC line set.

5. The method of claim 4, further comprising calculating, by the computing device, an equivalent tubing length associated with the number of 90-degree bends in the tubing of the HVAC line set.

6. The method of claim 5, further comprising adding the equivalent tubing length to a measurement of the length of the tubing of the HVAC line set to determine a total length of tubing of the HVAC line set.

7. A method of analyzing an HVAC line set, the method comprising:
   coupling a base unit of an HVAC line set analyzer system to an end of tubing of an HVAC line set, the base unit comprising a computing unit;
   temporarily sealing an opposing end of the tubing of the HVAC line set; and
   measuring a volume of the HVAC line set in response to pressurizing the HVAC line set by the base unit and measuring, with a pressure sensor, a pressure drop created in the HVAC line set by the base unit.

8. The method of claim 7, wherein measuring a volume of an HVAC line set further comprises:
   pressurizing the tubing of the HVAC line set with dry air to a preset pressure as measured by a pressure sensor of the base unit;
   opening a valve of the base unit to add a known volume to a volume of the tubing of the HVAC line set being measured;
   measuring a pressure drop caused by adding the known volume to the volume of the tubing of the HVAC line set being measured; and
   operating the computing device to calculate a volume of an unknown length of the tubing of the HVAC line set in response to calculating the pressure drop and the known volume.

9. The method of claim 7, further comprising determining a number of 90-degree bends of the HVAC line set in response to flowing air through the HVAC line set to establish a static pressure and calculating a difference between a measured static pressure and an expected static pressure.

10. The method of claim 9, wherein measuring a number of 90-degree bends of the HVAC line set further comprises:
   unsealing the opposing end of the tubing of the HVAC line set;
   flowing air through the HVAC line set in response to operating a fan of the base unit at a calibrated speed;

measuring a static pressure in the base unit with a differential pressure sensor;

operating the computing device to compare the measured static pressure with a look up table of the expected static pressure for a given length of tubing that is stored in a memory of the computing device of the base unit and calculate a difference of pressure; and analyzing the difference of pressure by the on-board computing device to determine a number of 90-degree bends in the tubing of the HVAC line set.

11. The method of claim 10, further comprising calculating, by the computing device, an equivalent tubing length associated with the number of 90-degree bends in the tubing of the HVAC line set.

12. The method of claim 11, further comprising adding the equivalent tubing length to a measurement of the length of the tubing of the HVAC line set to determine a total length of tubing of the HVAC line set.

\* \* \* \* \*